United States Patent [19]

Christ

[11] Patent Number: 5,108,469

[45] Date of Patent: Apr. 28, 1992

[54] EXHAUST-AIR PURIFYING UNIT

[75] Inventor: Michael Christ, Stuttgart, Fed. Rep. of Germany

[73] Assignee: Behr GmbH & Co., Stuttgart, Fed. Rep. of Germany

[21] Appl. No.: 591,885

[22] Filed: Oct. 2, 1990

[30] Foreign Application Priority Data

Oct. 17, 1989 [DE] Fed. Rep. of Germany ....... 3934513

[51] Int. Cl.[5] .................... B01D 47/06; B01D 51/10
[52] U.S. Cl. .......................................... 55/90; 55/80;
55/222; 55/227; 55/257.2; 55/257.7; 55/258;
55/259
[58] Field of Search ................. 55/80, 84, 89, 90, 222,
55/227, 228, 257.2, 257.7, 258, 259, 267, 269

[56] References Cited

U.S. PATENT DOCUMENTS

| | | | |
|---|---|---|---|
| 1,023,260 | 4/1912 | Luehrs et al. | 55/222 |
| 1,037,424 | 9/1912 | Braemer | 55/222 |
| 1,147,484 | 7/1915 | Cramer | 55/269 X |
| 1,228,939 | 6/1917 | Macfadden et al. | 55/222 |
| 1,813,692 | 7/1931 | Anderson | 55/222 |
| 1,861,158 | 5/1932 | Hilger | 55/222 X |
| 1,985,910 | 1/1935 | Anderson | 55/258 X |
| 2,057,579 | 10/1936 | Kurth | 55/222 X |
| 2,112,041 | 3/1938 | Miller | 55/90 X |
| 2,152,251 | 3/1939 | Gay | 55/227 X |
| 2,585,440 | 2/1952 | Collins | 55/227 X |
| 3,522,000 | 7/1970 | Kinney | 55/222 X |
| 3,618,301 | 11/1971 | Handman | 55/89 |
| 3,672,126 | 6/1972 | Gaettle | 55/222 X |
| 3,800,505 | 4/1974 | Tarves, Jr. | 55/222 X |
| 3,802,158 | 4/1974 | Ohle | 55/228 X |
| 3,833,205 | 9/1974 | McAnespie | 55/222 X |
| 3,991,820 | 11/1976 | Huggins | 55/269 X |
| 4,053,292 | 10/1977 | Schneider et al. | 55/227 |
| 4,171,722 | 10/1979 | Huggins | 55/269 X |
| 4,251,236 | 2/1981 | Fattinger et al. | 55/89 X |
| 4,253,854 | 3/1981 | James | 55/227 |
| 4,574,062 | 3/1986 | Weitman | 261/147 |
| 4,784,835 | 11/1988 | Fritz | 55/257.7 X |

FOREIGN PATENT DOCUMENTS 3734388 4/1989 Fed. Rep. of Germany .

OTHER PUBLICATIONS

Chem.-Ing.-Tech. 51, 2979, No. 11, S. 1053-1058.
G.I.; H. 17/18, 74. Jg., 1953, S. 299-300.
Textilpraxis International, 1976, Mar., S. 279-282.

*Primary Examiner*—Robert Spitzer
*Attorney, Agent, or Firm*—Foley & Lardner

[57] ABSTRACT

An exhaust-air purifying unit includes a housing, a first fan which is disposed in the housing and which draws exhaust air through the housing, and a heat exchanger which is disposed in the housing and which cools the exhaust air via heat transfer with a stream of cooling air which is drawn through the heat exchanger without contacting the exhaust air. A mechanical filter is disposed in the housing downstream of the heat exchanger, and a washing device is disposed in the housing upstream of the heat exchanger. The washing device sprays a washing liquid into the exhaust air as it enters the heat exchanger to remove harmful substances from the exhaust air.

25 Claims, 3 Drawing Sheets

EXHAUST-AIR PURIFYING UNIT

BACKGROUND OF THE INVENTION

The invention relates to an exhaust-air purifying unit comprising at least one fan for moving exhaust air, a heat exchanger in which the exhaust air is cooled, and a mechanical filter. Purifying units of this type are particularly useful in connection with yarn finishing units.

German Offenlegungsschrift 3,734,388 discloses an exhaust-air purifying unit which directs an exhaust-air flow through two successive heat-exchanger stages and finally through a mechanical filter. A fan is provided for drawing off the exhaust-air flow. In the known arrangement, the aim is to precipitate the condensible harmful substances in the exhaust-air flow by a considerable cooling in the two heat-exchanger stages so that only a small quantity of harmful substances is fed to the mechanical filter. On account of the two heat-exchanger stages and the pipelines connecting them, the known arrangement requires a considerable construction space, which is not available in all installations of the textile-processing or plastics-processing industry and is not available at all if retrofitting with an existing exhaust-air purifying unit is to be carried out.

Furthermore, units for adsorption and dust separation by so-called washers are known in which the exhaust-air flow is passed through a plurality of washing stages which in each case comprise a pebble bed, a washing-liquid feed, a drop separator and a washing-liquid return. Washers of this type likewise require a considerable construction space, since the intermixing of the washing liquid with the exhaust air is achieved only when the pebbles have a large contact surface area, there also being the problem that the pebble bed becomes clogged with harmful substances.

SUMMARY OF THE INVENTION

It is therefore the object of the present invention to create an exhaust-air purifying unit of the generic type which only requires a small construction space and with which a higher degree of separation of harmful substances can be achieved. In addition, simple installation for retrofitting on existing processing machines of the textile-processing or plastics-processing industry is to be possible.

In accordance with a first aspect of the invention, the exhaust-air purifying unit includes a housing, a first fan disposed in the housing and adapted to draw the exhaust air through the housing, a heat exchanger disposed in the housing and adapted to cool the exhaust air, a mechanical filter disposed in the housing, and a washing device disposed in the housing and adapted to wash the exhaust air.

In accordance with another aspect of the invention, the washing device comprises a spray system, a basin arranged below the heat exchanger and adapted to collect washing liquid, and a pressure line connecting the basin to the spray system. The washing device preferably comprises a closed liquid circuit including a pump having an inlet adapted to draw the liquid from the basin and an outlet connected to the pressure line. The spray system may comprise a plurality of nozzles located within the air shaft above the heat exchanger.

In accordance with still another aspect of the invention, an intermediate wall is formed in the housing, which wall defines a chamber and separates an exhaust air portion of the housing from a cooling-air portion. In addition, a second fan is provided which is disposed in the chamber and which is adapted to draw cooling-air through the exhaust-air purifying unit.

In accordance with yet another aspect of the invention the housing is essentially in the shape of a parallelepiped, and a supporting frame is provided onto which the housing is mounted, and wherein the supporting frame has openings formed therein for the insertion of lifting appliances.

Another object of the invention is to provide a method for purifying exhaust air.

In accordance with one aspect of the invention, the method comprises the steps of drawing the exhaust air into a housing, drawing cooling air into the housing, and simultaneously drawing the exhaust air and the cooling air through a heat exchanger without contacting one another, thereby cooling the exhaust air. Further steps include spraying a liquid into the exhaust air while the exhaust air is drawn into the heat exchanger to wash the exhaust air while the exhaust air travels through the heat exchanger, and then discharging the cooling air and the exhaust air from the housing.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

An exemplary embodiment of the exhaust-air purifying unit according to the invention is described in greater detail below with reference to the drawings, in which.

DETAILED DESCRIPTION OF THE PREFERRED EMBODIMENTS

Figure 1:
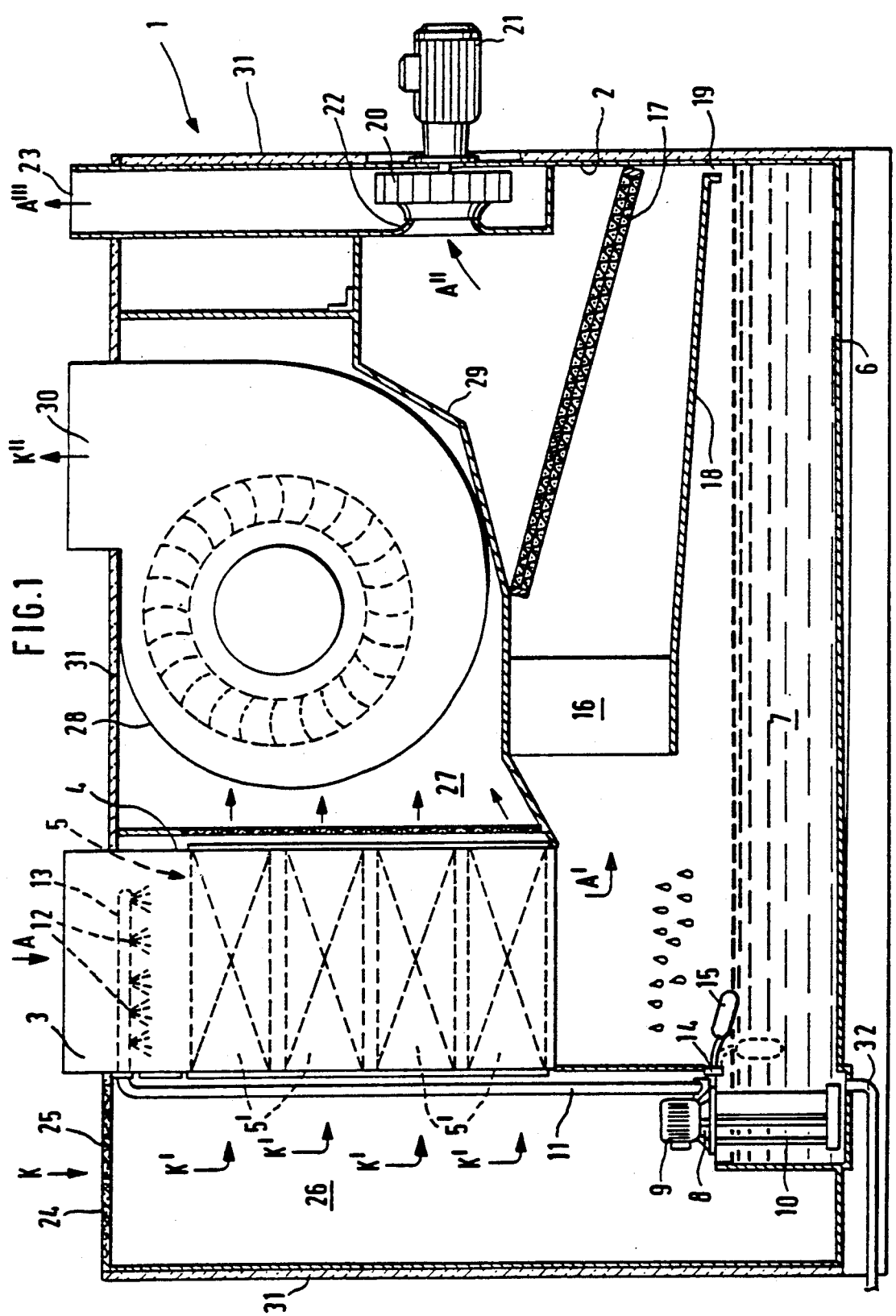
FIG. 1 shows a section through an exhaust-air purifying unit constructed in accordance with the present invention.

The essential advantages of the exhaust air purifying unit according to the invention can be seen from the fact that a very high degree of separation is achieved by thermal treatment and use of a washing liquid over an exceptionally small construction space, the treatment stages being integrated to the greatest extent with separate pipelines between the parts of the assemblies not being necessary.

According to a first further development of the subject matter of the invention, the heat exchanger is formed from a plurality of cross-flow heat-exchanger elements, it being advantageous that four cross-flow heat-exchanger elements are arranged one above the other in an essentially vertically running air shaft. In this way, an adequate temperature reduction can be achieved with a relatively small cross-section of the air shaft, as a result of which the separation of condensible harmful substances is achieved. In addition, this offers the advantage that the elements can be removed individually, which greatly facilitates manipulation for the purpose of cleaning. Cooling air drawn in from the environment is preferably used as a cooling medium, which cooling air, since it is not exposed to any pollution from harmful substances, can subsequently be discharged again into the environment.

The washing device conveniently comprises a pressure line, a spray system and a basin, arranged below the heat exchanger, for collecting the washing liquid. The washing liquid fed by means of the pressure line is sprayed into the exhaust-air flow through the spray system, as a result of which solid and liquid constituents of the exhaust-air flow combine with the washing liquid and are then fed to the basin. A preferred further development of the washing device will be seen from the fact that it is constructed as a closed liquid circuit in which washing liquid is drawn off from the basin by means of a pump and is then fed by means of the pressure line to the spray system. A filter is provided on the suction side of the pump so that only clean water is fed to the spray system.

The spray system is preferably arranged above the heat exchanger in the upper area of the air shaft and comprises a plurality of spray nozzles The spray nozzles enable the washing liquid to be added in a finely sprayed manner to the exhaust-air flow. In addition, considerable turbulence takes place in the heat exchanger arranged downstream of the nozzles, which turbulence results in intensive mixing of the washing liquid with the portions of harmful substances in the exhaust-air flow. In a further refinement, a further pump is provided for pumping off excess washing liquid out of the container, to which pump a disposal line, which leads, for example, to an emulsion-separating device, is connected. The pump is conveniently controlled as a function of the liquid level in the container by means of a switch actuated by a float. This provides automatic monitoring to ensure no excessive rise in the liquid level and prevents liquid from being drawn out of the basin along with the air flow on account of the suction action of the fan.

In a further refinement of the subject matter of the invention, provision is made for a drop separator to be arranged in the flow path between the heat exchanger and the mechanical filter and for the air flow to undergo a change in direction of about 90° in front of the drop separator. On account of the change in direction of the air flow, the solid and liquid constituents are precipitated, since they keep to their direction of movement vertically downward. The air flow thus purified passes into the drop separator, where the residual moisture still present is separated. On account of the aggressive media in the exhaust-air flow, the drop separator and the cross-flow heat-exchanger elements are made of high-grade steel. The mechanical filter consists of a mesh which is formed from high-grade-steel wires and which is edged by a rigid frame.

In the housing, there is an intermediate wall which separates the exhaust-air portion from the cooling-air portion and which forms a chamber accommodating a fan for the cooling air. This fan is conveniently constructed as a radial-flow fan. A blow-out connection is attached to this fan on the pressure side. The fan for the exhaust-air flow is arranged downstream from the mechanical filter, and a blow-out opening adjoins on the pressure side of the fan. The purified exhaust-air flow emerging from the blow-out opening is discharged to the environment. In addition, the cooling air emerging from the blowout connection, on account of its heating in the heat exchanger, can be used for heat recovery. The cooling air could also be utilized, for example, for heating purposes.

If, however, the emerging cooling-air flow is not to be fed for any further use, it is convenient for a hood to be provided which spans the blow-out connection and the blow-out opening, adjoining which hood is a blow-out duct. This uniting of both air flows has the advantage that residual moisture possibly present in the exhaust-air flow is distributed over the total volume of both air flows and consequently does not tend to form mist or visible water vapor even when passing into relatively cold ambient air.

To protect the heat-exchanger elements from contamination by impurities present in the cooling air, it is convenient for a dust filter to be provided in the cooling-air intake opening All openings for the intake and discharge of the exhaust air and cooling air are conveniently arranged on the upper side of the housing. For the purpose of sound and heat insulation, the housing is provided with an insulating layer, preferably having a thickness of 20 mm to 30 mm. The housing is essentially configured in the shape of a parallelepiped and is mounted with all assemblies located therein on a supporting frame. In this may, the exhaust-air purifying unit can be transported in the ready-assembled state to the point of destination, as a result of which it is suitable in particular as a retrofitting unit. To simplify transport, the frame has openings for the insertion of lifting appliances, such as, for example, fork-lift trucks, elevating-platform trucks loading gear or the like.

FIG. 1 shows an exhaust-air purifying unit 1 which is arranged in a housing 2 roughly in the shape of a parallelepiped. Arranged on the upper side of the housing 2 is an exhaust-air intake connection 3, adjoining which is a vertically running or extending air shaft 4 having an air/air heat exchanger 5 disposed therein. The heat exchanger 5 comprises four cross-flow heat-exchanger elements 5' arranged one above the other. Located below the air shaft 4 is a basin 6 containing a washing liquid 7, water in particular being suitable as the washing liquid. A pump 8, driven by an electric motor 9, is provided on the left hand side of the basin 6, as viewed in FIG. 1. Pump 8 draws off washing liquid from the basin 6 via a filter 10 and pumps it through a pressure line 11 to a spray system 13, which comprises a plurality of spray nozzles 12 Spray system 13 is located in the area of the air shaft 4 above the cross-flow heat-exchanger elements 5'. In addition, there is a switch 14 which is controlled as a function of the level of the washing liquid and is actuated by a float 15. This switch 14, when actuated when float 15 detects a sufficiently high liquid level, controls a second pump (not shown in FIG. 1) which pumps the excess washing liquid for further disposal through a disposal line 32 into an emulsion-separating unit.

Above the basin 6, a drop separator 16 is arranged laterally offset from the air shaft 4, downstream from which drop separator 16 there is arranged a filter 17. The filter 17 consists of a wire mesh of high-grade steel. Extending below the filter 17, starting at the drop separator 16, is a plate 18 which runs at a slight incline and whose end remote from the drop separator 16 is provided with an opening 19 for the passage of the separated washing liquid into the basin 6. This plate 18 mainly serves as a partition so that the air flow is conveyed completely through the drop separator 16. Located above the filter 17 is a first radial-flow fan 20 which is driven by an electric motor 21 and draws in air flow through an inlet nozzle 22 and blows it finally through a blow-out opening 23 into the ambient air.

Likewise located on the upper side of the housing 2 is a cooling-air intake opening 24 in which a dust filter 25 is arranged. Located downstream from the dust filter 25 is a cooling-air duct 26 from which the cooling air passes through the cross-flow heat-exchanger elements 5' into a chamber 27 in which a second radial-flow fan 28 is arranged. An intermediate wall 29 extends between the part of the unit which carries the exhaust air and in which the drop separator 16 and the filter 17 are arranged and the chamber 27. Intermediate wall 29 starts from the bottom end of the air shaft 4 and runs above the drop separator 16 and the filter 17 and separates the cooling-air portion from the exhaust-air portion of the unit. The second radial-flow fan 28 is connected to a blow-out connection 30 arranged on the upper side of the housing 2. The housing 2 is provided on all sides with an insulating layer 31 for sound and heat insulation.

During operation of the exhaust-air purifying unit 1, exhaust air is drawn in through the exhaust-air intake connection 3 in the direction of arrow A. Washing liquid finely sprayed by the spray nozzles 12 of the spray system 13 is added in this exhaust-air flow in the upper area of the air shaft 4 and is fed to the heat exchanger 5. Due to the ribbed heat-exchanger elements 5', the exhaust air is brought intensively into contact with the washing water in a manner discussed in more detail below in connection with FIG. 3. This intensive contact leads to thorough mixing and binding of portions of harmful substances with the liquid. At the same time, cooling air flows through the cooling-air intake opening 24 and the dust filter 25 located therein and into the cooling-air duct 26, in which the cooling-air flow is split into partial flows K' and fed to the heat-exchanger elements 5'. The cooling air flowing through the heat-exchanger elements 5' brings about a reduction in the exhaust-air temperature and a cooling of the washing liquid which has been heated up by mixing with the exhaust air.

At the bottom end of the air shaft 4, the exhaust-air flow is deflected by 90° in accordance with arrow A' in the direction of the drop separator 16. This extreme deflection leads to the solid and liquid constituents of the mass flow which emerges at the bottom end of the air shaft 4 keeping to their path of movement vertically downward so that they plunge into the container 6 filled with washing liquid 7. The liquid collected there is drawn in through the filter 10 by the pump 8 and is fed via the pressure line 11 to the spray system 13, as a result of which a closed washing-liquid circuit is formed. The exhaust-air flow emerging from the drop separator 16 is fed to the filter 17, and the liquid collected on the back of the drop separator 16 is directed along the plate 18 and fed through the opening 19 to the basin 6. In accordance with arrow A'', the exhaust-air flow is drawn in through the inlet nozzle by the first radial-flow fan 20 and discharged through the blow-out opening 23 in the direction of arrow A''' to the ambient air. The partial flows of the cooling air which emerge from the heat-exchanger elements 5' are blown by the fan 28 through the blow-out connection 30 in the direction of arrow K'' into the ambient air.

Figure 2:
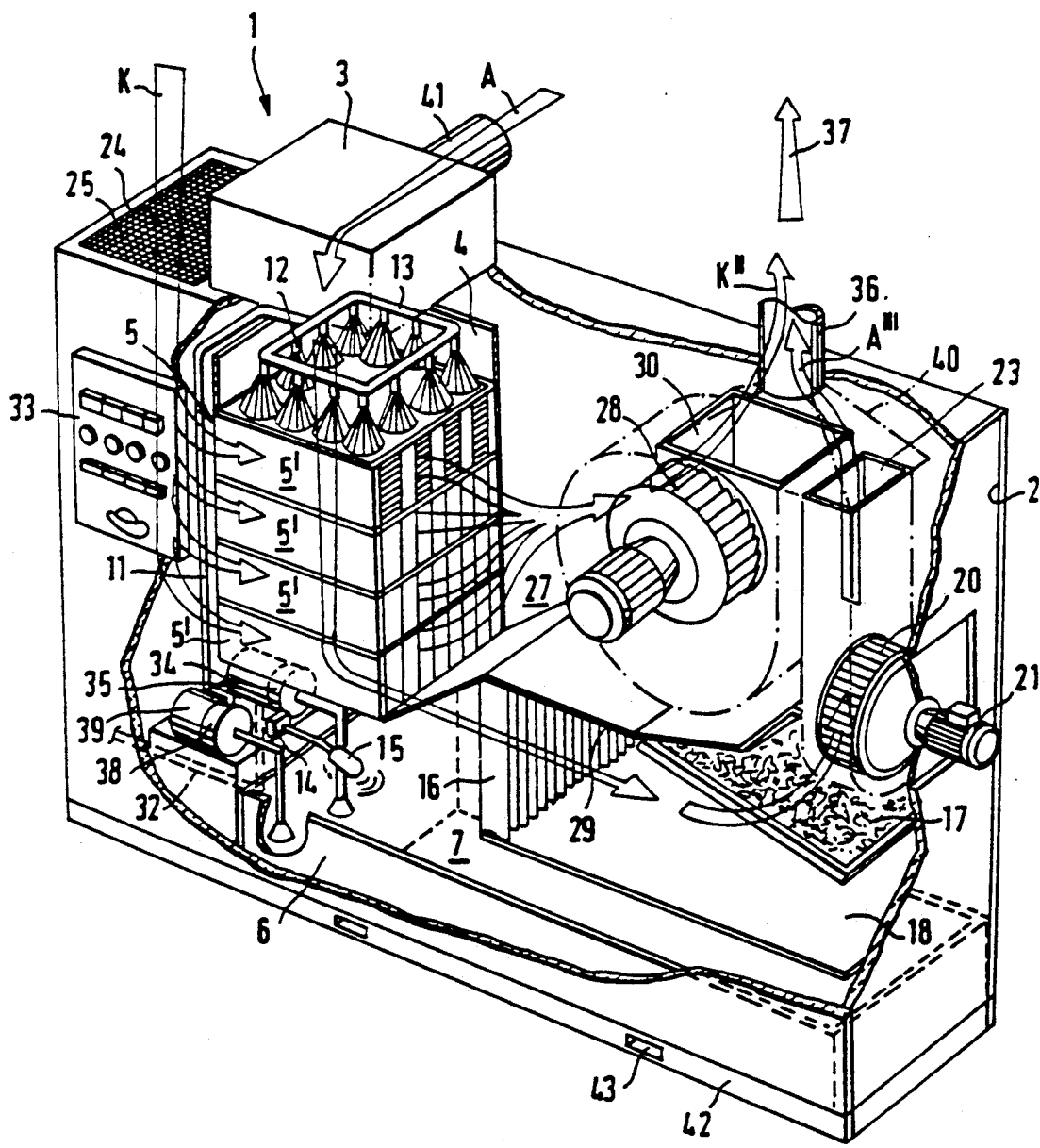
FIG. 2 shows a perspective representation of a modified embodiment of the exhaust-air purifying unit.

FIG. 2 shows a perspective view of an exhaust-air purifying unit which essentially corresponds to the embodiment in FIG. 1 but is modified with regard to the washing-liquid pump unit and the blow-out of air. For the same parts, the reference numerals correspond to those in FIG. 1. It is apparent from FIG. 2 that the exhaust-air purifying unit is fully accommodated in the parallelepiped-shaped housing 2 and is mounted on a supporting frame 42, in which arrangement this frame 42 can preferably be constructed from channel-section steel. Provided in this frame 42 are openings 43 which are used for the insertion of lifting appliances so that, for example, transport of the entire unit by means of a forklift truck, an elevating-platform truck or the like is possible.

Reference numeral 33 designates a control panel of the electrical installation, from which control panel the control and power lines are run to the diverse switches and drive motors. Two pumps are arranged below the control panel 33, in which arrangement a first pump 34, which forms a construction unit with an electric motor 35, draws off washing liquid 7 from the basin 6 and feeds it through a disposal line 32 to a conventional emulsion-separating device. This disposal is effected as a function of the respective liquid level, i.e. pump 34 is actuated only when the liquid level in basin 6 is sufficiently high to actuate float 15. The float-actuated switch 14 is used for this purpose. Located next to the first pump 34 is a second pump 38 which is likewise driven by an electric motor 39 and which feeds the washing liquid 7 through a pressure line 11 to the spray system 13.

Attached to the exhaust-air intake connection 3 is a connecting duct 41 which feeds the exhaust air from a unit (not shown in the drawing), for example a yarn-finishing unit; to the exhaust-air purifying unit 1. Whereas in FIG. 1 the air flows A''' and K'' leave the exhaust-air purifying unit 1 separately, according to FIG. 2 a hood 40 is arranged above a blow-out opening 23 and the blowout connection 30, into which hood 40 both air flows pass and are combined in the same. Adjoining the hood 40 is a blow-out duct 36 from which a common air flow in accordance with arrow 37 is then discharged to the ambient air. Uniting the two air flows has the advantage that residual moisture possibly present in the air flow A''' is distributed over the total volume of both air flows A''' and K'' and consequently does not tend to form mist or visible water vapor even when passing into relatively cold ambient air. The separate discharge of the air flows A''' and K'' is of advantage when the air flow K'' heated in the cross-flow heat-exchanger elements 5' is to be used for the preheating of process air, for the heating of buildings or the like.

The mode of operation of the exhaust-air purifying unit 1 according to FIG. 2 is the same as already described above with reference to FIG. 1.

Figure 3:
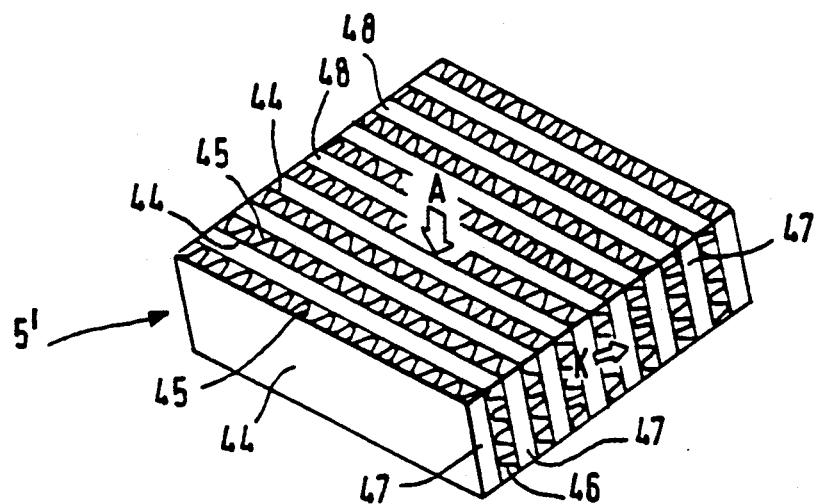
FIG. 3 shows a schematic representation of a heat exchanger element.

FIG. 3 schematically shows a cross-flow heat-exchanger element 5'. This heat-exchanger element 5' consists of a set of high-grade-steel plates 44 and corrugated ribs 45 and 46 stacked one on top of the other. It is apparent here that the direction of the corrugation of the corrugated ribs 46 is offset by 90° from the direction of the corrugated ribs 45 so that ducts alternating vertically and horizontally result. The lateral margins of the vertical ducts formed by the corrugated ribs 45 are closed by cover plates 47. In the same way, the lateral margins of the horizontally-running ducts are closed by cover plates 48. This construction of the heat-exchanger elements 5' results in a plurality of ducts for the exhaust-air flow A and a plurality of ducts, running crosswise thereto, for the cooling-air flow K.

Figure 4:
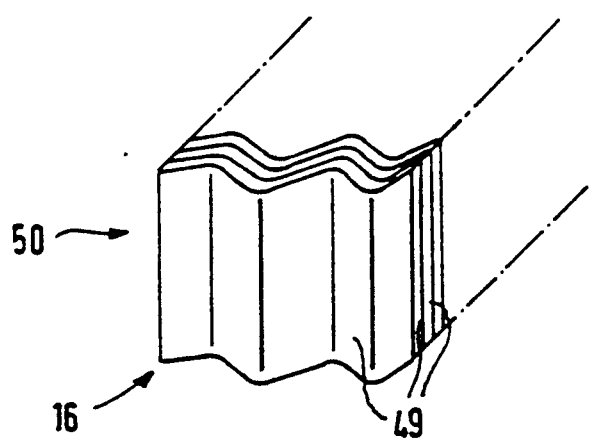
FIG. 4 shows a schematic representation of a drop separator.

FIG. 4 shows as a component part of the drop separator 16, which consists of a plurality of high-grade-steel corrugated sheets 49 running essentially in parallel. The peaks or valleys of the corrugation run vertically and are thus orientated transversely to the throughflow direction 50. Since the air flowing through the drop separator 16 undergoes repeated deflection on account of the corrugation of the sheets 49, drops are separated from the air flow.

Figure 5:
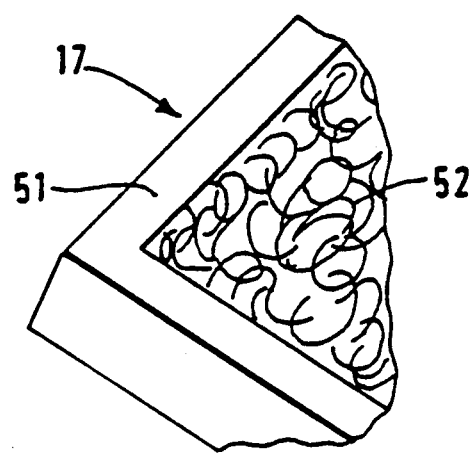
FIG. 5 shows a detail of a filter in schematic representation.

FIG. 5 shows a detail of the filter 17, which has a rigid frame 51 by means of which the filter 17 is held in the exhaust-air purifying unit 1. The actual filter consists of a wire mesh 52, this wire being made of high-grade steel wires. The wire mesh forms a plurality of narrow interstices which hold back impurities present in the air flow passing therethrough.

The heat-exchanger elements 5', the drop separator 16 and the filter 17 are mounted in the exhaust-air purifying unit 1 in such a way that they can easily be removed for cleaning and can just as easily be pushed in again.

The exhaust-air purifying unit described above is suitable in particular for purifying air heavily contaminated with harmful substances and water vapor, as occurs for example in the working processes of yarn-finishing units. The exhaust-air flows of yarn-finishing units of this type are so heavily contaminated with harmful substances and water vapor that there is about 150 kg of condensate per hour in the exhaust-air flow. With the exhaust-air purifying unit according to the invention, it is possible to filter out this considerable portion of harmful substances before the exhaust air is passed into the open.

What is claimed is:

1. A method for purifying exhaust air, said method comprising the steps of:
   (A) drawing exhaust air into a housing;
   (B) drawing cooling air into said housing;
   (C) simultaneously drawing said exhaust air and said cooling air through an air-to-air heat exchanger without contacting one another, thereby cooling said exhaust air, said heat exchanger comprising a plurality of cross-flow air-to-air heat-exchanger elements which are arranged one above the other in an air shaft extending substantially vertically within said housing, each of said cross-flow heat exchanger elements comprising a set of metal plates and corrugated ribs stacked alternately one on top of the other, the corrugations in each to successive ribs being offset from one another by 90°;
   (D) drawing liquid out of a basin located beneath said heat exchanger; then
   (E) spraying a liquid into said exhaust air from above said heat exchanger before said exhaust air enters said heat exchanger from above said heat exchanger to wash said exhaust air while said exhaust air travels through said heat exchanger; then
   (F) drawing said exhaust gas through a drop separator disposed in said housing in a flow path connecting an outlet of said heat exchanger to said mechanical filter, said drop separator comprising a plurality of corrugated, high-grade-steel plates arranged side-by-side, said flow path undergoing a change in direction of approximately 90° proximate an inlet of said drop separator; and then
   (G) discharging said cooling air and said exhaust air from said housing.

2. The method of claim 1, wherein said cooling air and exhaust air are discharged into a common hood.

3. A unit for purifying exhaust air, said exhaust-air purifying unit comprising:
   (A) a housing having first and second inlets and an outlet;
   (B) a first fan disposed in said housing and adapted to draw exhaust air through said housing from said first inlet to said outlet;
   (C) an air-to-air heat exchanger disposed in said housing between said first inlet and said outlet and adapted to cool said exhaust air after said exhaust air has been drawn into said housing by said fan;
   (D) a mechanical filter disposed in said housing between said heat exchanger and said outlet and adapted to remove particles from said exhaust air after said exhaust air has been cooled by said heat exchanger, wherein a flow-path is formed in said housing between said heat exchanger and said mechanical filter;
   (E) a washing device having at least a portion thereof disposed in said housing between said first inlet and said heat exchanger and adapted to wash said exhaust air before said exhaust air enters said heat exchanger;
   (F) an intermediate wall formed in said housing, which wall defines a chamber and separates an exhaust air portion of said housing, which is connected to said first inlet and said outlet, from a cooling-air portion, which is connected to said second inlet;
   (G) a second fan which is disposed in said chamber and which is adapted to draw cooling-air into said housing from said second inlet and through said air-to-air heat exchanger, which cooling air serves as a cooling medium for said exhaust air; and
   (H) a drop separator disposed in said flow path and having an inlet communicating with said heat exchanger and an outlet communicating with said mechanical filter, said flow path undergoing a change in a direction of approximately 90° proximate said inlet of said drop separator.

4. The exhaust-air purifying unit as claimed in claim 3, wherein said heat exchanger comprises a plurality of cross-flow heat-exchanger elements.

5. The exhaust-air purifying unit as claimed in claim 4, wherein four of said cross-flow heat-exchanger elements are arranged one above the other in an air shaft extending essentially vertically within said housing.

6. The exhaust-air purifying unit as claimed in claim 4, wherein each of said cross-flow heat exchanger elements comprises a set of high-grade-steel plates and corrugated ribs stacked alternately one on top of the other, the corrugations in each two successive ribs being offset from one another by 90°.

7. The exhaust-air purifying unit as claimed in claim 3, further comprising a dust filter disposed in said housing proximate said second inlet.

8. The exhaust-air purifying unit as claimed in claim 3, wherein said washing device comprises a spray system, a basin arranged below said heat exchanger and adapted to collect washing liquid, and a pressure line connecting said basin to said spray system.

9. The exhaust-air purifying unit as claimed in claim 8, wherein said washing device further comprises a closed liquid circuit including a pump having an inlet adapted to draw said liquid from said basin and an outlet connected to said pressure line, and wherein said washing device further comprises a filter attached to said inlet.

10. The exhaust-air purifying unit as claimed in claim 9, wherein said heat exchanger is located in an air shaft extending essentially vertically within said housing and wherein said spray system comprises a plurality of nozzles located within said air shaft above said heat exchanger.

11. The exhaust-air purifying unit as claimed in claim 9, further comprising a disposal line and a second pump which is connected to said disposal line and which is adapted to pump excess washing liquid out of said basin via said disposal line.

12. The exhaust-air purifying unit as claimed in claim 11, further comprising a float disposed in said basin and a switch which is connected to said float and to said second pump and which is adapted to control said second pump as a function of a liquid level in said basin as detected by said float.

13. The exhaust-air purifying unit as claimed in claim 3, wherein said drop separator comprises a plurality of corrugated, high-grade-steel plates arranged side-by side.

14. The exhaust-air purifying unit as claimed in claim 3, wherein said second fan comprises a radial-flow fan having an outlet connected to a blow-out connection of said housing.

15. The exhaust-air purifying unit as claimed in claim 14, wherein said first fan is arranged downstream of said mechanical filter and has an outlet cooperating with a blow-out opening formed in said housing.

16. The exhaust-air purifying unit of claim 15, further comprising a hood spanning said blow-out connection and said blow-out opening and a blow-out duct connected to an outlet of said hood.

17. The exhaust-air purifying unit of claim 16, wherein all openings for intake and discharge of exhaust air and cooling air are formed on an upper side of said housing.

18. The exhaust-air purifying unit of claim 3, further comprising an insulating layer provided on an inner surface of said housing.

19. The exhaust-air purifying unit of claim 18, wherein said insulating layer has a thickness of between 20 mm and 30 mm.

20. The exhaust-air purifying unit of claim 3, wherein said housing is essentially in the shape of a parrelepiped, and further comprising a supporting frame onto which said housing is mounted, and wherein said supporting frame has openings formed therein for the insertion of lifting appliances.

21. A unit for purifying exhaust air, said exhaust-air purifying unit comprising:
(A) a housing having first and second inlets and an outlet;
(B) means, disposed in said housing, for drawing said exhaust air through said housing from said first inlet to said outlet;
(C) means, disposed in said housing, for cooling said exhaust air after said exhaust air is drawn into said housing by said means for drawing;
(D) a mechanical filter disposed in said housing between said means for cooling and said outlet, wherein a flow-path is formed in said housing between said means for cooling and said mechanical filter; and
(E) washing means, at least a portion of which is disposed in said housing between said first inlet and said means for cooling, for washing said exhaust air before said exhaust air enters said means for cooling;
(F) an intermediate wall formed in said housing, which wall defines a chamber and separates an exhaust air portion of said housing, which is connected to said first inlet and said outlet, from a cooling-air portion, which is connected to said second inlet;
(G) a second fan which is disposed in said chamber and which is adapted to draw cooling-air into said housing from said second inlet and through said means for cooling; and
(H) a drop separator disposed in said flow path and having an inlet communicating with said means for cooling and an outlet communicating with said mechanical filter, said flow undergoing a change in direction of approximately 90° proximate said inlet of said drop separator.

22. The exhaust air-purifying unit of claim 21, wherein said means for drawing said exhaust air through said housing comprises a first fan.

23. The exhaust air-purifying unit of claim 22, wherein said means for cooling comprises a plurality of heat exchanger elements disposed in an exhaust-air shaft and a second fan which is adapted to draw cooling air through said heat exchanger elements without contacting said exhaust air.

24. The exhaust air-purifying unit of claim 21, wherein said washing means comprises a plurality of nozzles located adjacent an inlet of a portion of said means for cooling.

25. A unit for purifying exhaust air, said exhaust-air purifying unit comprising:
(A) a housing having first and second inlets and an outlet;
(B) a first fan disposed in said housing and adapted to draw exhaust air through said housing from said first inlet to said outlet;
(C) a heat exchanger disposed in said housing and adapted to cool said exhaust air after said exhaust air has been drawn into said housing by said fan, said heat exchanger comprising a plurality of cross-flow air-to-air heat-exchanger elements which are arranged one above the other in an air shaft extending substantially vertically within said housing;
(D) a mechanical filter disposed in said housing between said heat exchanger and said outlet and adapted to remove particles from said exhaust air after said exhaust air has been cooled by said heat exchanger, wherein a flow-path is formed in said housing between said heat exchanger and said mechanical filter;
(E) a washing device having at least a portion thereof disposed in said housing between said first inlet and said heat exchanger and adapted to wash said exhaust air before said exhaust air enters said heat exchanger; and
(F) a drop separator disposed in said housing in said flow path, said drop separator comprising a plurality of corrugated, high-grade-steel plates arranged side-by-side, said flow path undergoing a change in direction of approximately 90° proximate an inlet of said drop separator.

* * * * *